July 13, 1954
E. C. PETRY
2,683,348
MODULATED CONTINUOUS FLOW HYDRAULIC CONTROL APPARATUS
Filed May 26, 1950
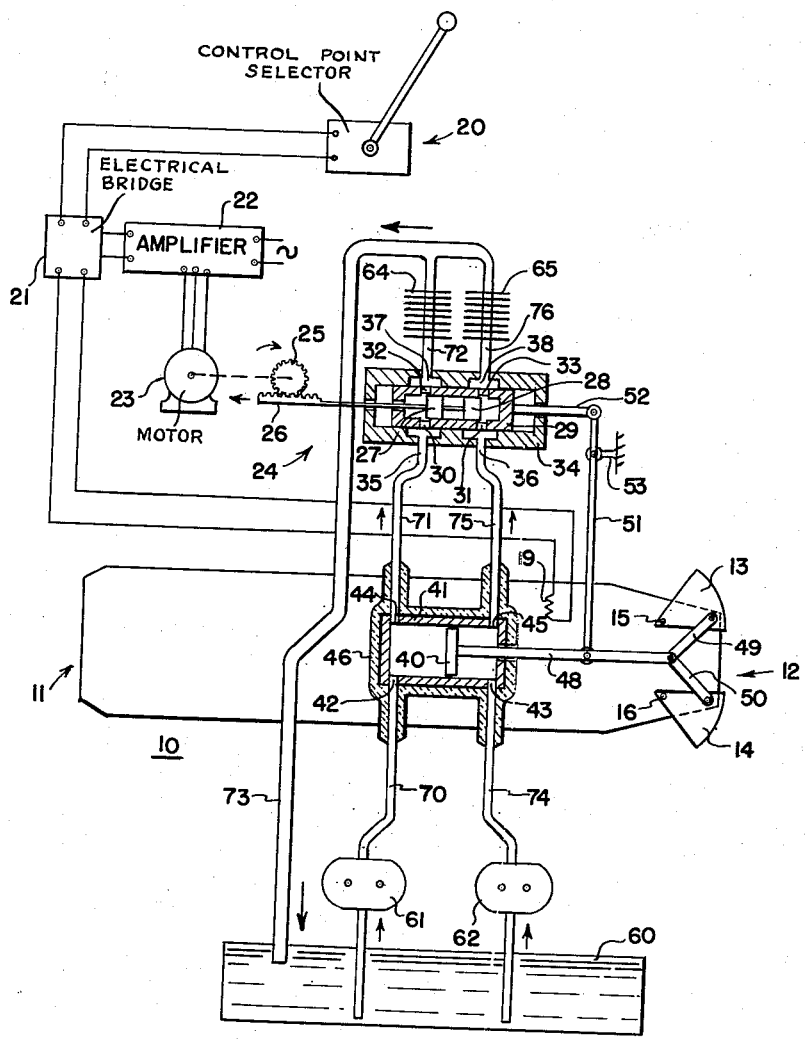
Inventor
EDUARD C. PETRY
By George H Fisher
Attorney Patented July 13, 1954

2,683,348

UNITED STATES PATENT OFFICE 2,683,348

MODULATED CONTINUOUS FLOW HYDRAULIC CONTROL APPARATUS

Eduard C. Petry, Hopkins, Minn., assignor to Minneapolis-Honeywell Regulator Company, Minneapolis, Minn., a corporation of Delaware Application May 26, 1950, Serial No. 164,360

2 Claims. (Cl. 60—35.6)

The present invention is concerned with a new and improved hydraulic control system which is particularly adapted for use under adverse temperature conditions.

In present day engines of the jet type having a variable exhaust outlet control, it has been found that a hydraulic servo mechanism has advantages for use in positioning the outlet control. When a hydraulic servo is used, however, it is generally necessary to mount the servo actuator directly adjacent the engine with the result that the mechanism will be subject to the heat of the engine and will become relatively hot. Unless special precautions are taken, the heat from the engine will cause thermal decomposition of the hydraulic fluid to thereby render the system ineffective for its intended purpose. In the copending application of Joseph Abdo Serial No. 137,559 filed January 9, 1950 there is shown a control system for continuously circulating hydraulic fluid through the servo actuator portion of the hydraulic system and then passing the circulating fluid through a suitable cooler to remove the heat which has been picked up from the actuator portion of the system. In the Abdo invention the positioning of the servo actuator is accomplished by operating shut-off valves in the circulating paths in order to build up a control pressure on either side of the servo actuator piston. In the present arrangement the control of the continuously circulating fluid is accomplished by a modulating type of pilot valve which modulates the fluid pressure in all of the fluid circulating passages at the same time in order to build up or decrease the pressure of the hydraulic fluid to cause the operation of the servo piston.

It is therefore an object of the present invention to provide a new and improved hydraulic servo mechanism wherein the hydraulic fluid is continuously circulated through a servo actuator assembly and through suitable coolers.

Another object of the present invention is to provide a hydraulic servo mechanism having a servo piston with a pair of continuous fluid flow passages operating on either side of the piston with a pilot valve for modulating the fluid pressure of the continuously circulating fluid in both of the passages at the same time.

A further object of the present invention is to provide a hydraulic servo mechanism having a servo piston with a pair of fluid flow passages which are continuously passing hydraulic fluid on either side of a servo piston with a pilot valve assembly for modulating the fluid pressures of the hydraulic fluid in both of the passages at the same time and with a follow-up mechanism positioned by the servo piston for stabilizing the system.

These and other objects of the present invention will be understood upon a consideration of the following specification and appended drawing.

Referring to the drawing, the numeral 10 represents a combustion engine of the jet type having an inlet at 11 and an outlet at 12. Controlling the cross sectional area of the outlet 12 are a pair of shutters or eyelids 13 and 14 which are pivoted at 15 and 16 and arranged to vary the outlet area 12 depending upon their adjustment.

For determining what the desired position of the eyelids 13 and 14 should be, there is provided a temperature control network which includes an engine temperature responsive resistor 19 and a control point selector 20. The resistor 19 and the selector 20 may be parts of a suitable electric bridge indicated generally by the numeral 21. The output from this bridge is fed into an amplifier 22 and the output from this amplifier is arranged to drive a suitable motor 23. This bridge, amplifier and motor combination may be of the type disclosed in the Albert P. Upton patent, No. 2,423,534 issued July 8, 1947.

Motor 23 is arranged to control a hydraulic pilot valve assembly 24 by reversibly driving a pinion gear 25 which operates a rack 26. The rack 26 carries on the end thereof a pair of valve members 27 and 28 which are disposed for axial movement within a hollow follow-up or rebalancing sleeve 29. The rebalancing sleeve has a pair of input ports 30 and 31 and a pair of outlets ports 32 and 33. The rebalancing sleeve 29 is arranged for axial movement within the cylindrical housing 34 of the pilot valve assembly 24. This cylindrical housing 34 has a pair of inlet ports 35 and 36 and a pair of outlet ports 37 and 38. Each of the ports 35, 36, 37 and 38 have an enlarged cross sectional area on the inner side of the cylinder 34 and is so arranged that there will be no obstruction between these ports and the ports in the rebalance sleeve 29 as the sleeve 29 moves axially within the housing 34.

The pilot valve assembly 24 is used to control the positioning of a piston 40 which is arranged for axial movement within a cylinder 41. The cylinder 41 mounted on the side of engine 10, has a pair of inlet ports 42 and 43 and a pair of outlet ports 44 and 45. Surrounding the cylinder 41 and a portion of the lines feeding into the inlet and outlet ports is a suitable insulating material 46. A piston rod 48, connected to the piston 40, is arranged to operate a pair of toggle members 49 and 50, the latter of which are connected to the eyelids 13 and 14. A follow-up link 51 is connected to the piston rod 48 and to an actuating rod 52 which is attached to the rebalance sleeve 29, the link 51 being pivoted at 53.

The supply of hydraulic fluid for the system is obtained from a supply tank 60 and is pumped by a pair of positive displacement pumps 61 and 62, driven by means not shown. Cooling fins 64 and 65 are arranged on the hydraulic lines for removing heat from the fluid after it has circulated through the cylinder 41 and pilot valve 24 although, obviously, any cooling surface that will prevent heat accumulating in the system may be used.

Operation

In considering the operation of the apparatus, assume first that the system is in a balanced condition, that there is no external force acting on the system under a steady state condition, and the loads consisting of inertia forces only during a transient. When in a balanced condition the temperature of the resistor 19 will be at a value which has been selected by the temperature selector 20 so that there will be no input signal to the amplifier 22 and no signal for driving the motor 23. Under balanced conditions the valve members 27 and 28 will be so positioned within the rebalancing sleeve 29 that the members 27 and 28 will be covering the inlet ports 30 and 31 by an equal amount and will also be covering the outlet ports 32 and 33 by an equal amount. In other words, the cross sectional openings of the two portions of the pilot assembly will be equal.

With the pumps 61 and 62 in operation hydraulic fluid will be pumped from the supply 60 through the system. The pump 61 will force hydraulic fluid through a first passage which can be traced through conduit 70, inlet port 42, cylinder 41 (to the left of the piston 40), conduit 71, inlet port 35 of the pilot valve housing 34, port 30 (partially covered by the valve member 27), outlet port 32, outlet port 37, conduit 72, cooler 64, and conduit 73 back to the supply tank 60. The pump 62 will be forcing hydraulic fluid from the tank 60 through a second passage which can be traced through the conduit 74, inlet port 43, the right-hand end of the piston 40, outlet port 45, conduit 75, inlet port 36, the port 31 (partially covered by the valve member 28) outlet port 33, outlet port 38, conduit 76, cooler 65, and conduit 73 back to the supply tank 60.

As long as the valve members 27 and 28 are covering the same amount of the inlet and outlet ports of the rebalance sleeve 29 the pressure drop of the hydraulic fluid in the respective passages through the pilot valve 24 will be equal so that the pressures on the left and right side of piston 40 will be equal and there will be no tendency for the piston 40 to move.

Under the conditions assumed above, no account has been taken of any forces which may be acting on the eyelids 13 and 14 due to the gases flowing from the engine. Obviously, these forces will tend to cause a displacement of the piston 40 and this tendency must be overcome by a pressure unbalance in the cylinder which pressure unbalance will produce a force opposite the force acting on the eyelids. To accomplish this in the balanced condition, the areas of the ports in valve 24 are unequal by an amount that will produce the requisite pressures within the cylinder.

Assume that the temperature condition within the engine 10 indicates a need for the reduction of the temperature. To reduce the temperature by means of varying the exhaust outlet area it is necessary to increase the outlet area. This will mean that the eyelids 13 and 14 will have to move outwardly with respect to the exhaust outlet 12. If the temperature is too high there will be an unbalance signal from the ridge 21 fed into the amplifier 22 and the motor 23 will be effective to rotate the pinion gear 25 in a clockwise direction. When the pinion gear is rotated in a clockwise direction, the rack 26 will be moved toward the left and will move the valve members 27 and 28 toward the left. As the valve member 27 moves toward the left over the inlet port 30 and outlet port 32 of the rebalance sleeve there will be a reduction of the cross sectional area of the passage through these ports. When the valve member 28 is moved toward the left the inlet port 31 and outlet port 33 of the rebalance sleeve will be further uncovered so that there will be an increase in the cross sectional area of the passage through these ports. With the reduction of area due to the valve member 27 and the increase in area due to the valve member 28, an increase in pressure drop will be built up in the first passage across the valve member 27 with a corresponding decrease in pressure drop in the second passage across the valve member 28. This will result in greater pressure building up on the left-hand side of the piston 40 and with the pressure on the right-hand side of the piston 40 dropping to cause the piston 40 to move toward the right and, by means of the toggle members 49 and 50, to pivot the eyelids 13 and 14 so that they will open and increase the outlet area of the exhaust 12.

When the piston for rod 48 moves toward the right the link 51 will be pivoted in a counter-clockwise direction about the pivot point 53 and will move the rod 52 and the rebalance sleeve 29 toward the left. This movement toward the left will cause the cross sectional areas controlled by the members 27 and 28 to be equalized so that the pressure drops thereacross will tend to be the same. When the pressure drops across the pilot valve assembly 24 are equal in both of the channels, the pressures on the left and right side of the piston 40 will be equal and there will be no force for moving the piston.

It will be obvious that if movement of the eyelids 13 and 14 should be necessary in the opposite direction to correct a low temperature condition within the engine, the operations assumed above will be reversed and, after the piston 40 has moved the eyelids to the newly desired position the system will again be balanced and the piston 40 will remain in a fixed position.

Should the gas pressure loading on the eyelids 13 and 14 be sufficient to cause movement of the piston 40, any movement occurring will cause the link 51 to displace the rebalance sleeve 29 to cause a change in the pressure drops across the members 27 and 28. The change will be in a direction to compensate for movement of the piston and to maintain the system in an effectively balanced condition.

It will be obvious that even while an adjustment is being made in the pilot valve assembly 24 the fluid pumped by the pumps 61 and 62 will be continuously circulating through the chambers to the left and right of the piston 40. This continuous flow of fluid will be effective to carry the heat within the cylinder 41 away to the cooling fins 64 and 65 where it is removed from the system. It will also be obvious that the movement of the valve members 27 and 28 is accomplished in a modulating manner so that there can be a gradual change in the cross sectional areas and pressure drops controlled by the valve members to accomplish a positioning of the piston 40 without appreciable interruption of the flow of the fluid through the system. With this type of a circulating system it is possible to remove a maximum amount of heat from the system and to reduce the components in their size and weight because of the more efficient method of circulation.

From the foregoing it will be seen that there has been provided a hydraulic servo system wherein a continuous flow of fluid is fed through the main servo cylinder and the pressure of that flow is modulated to effect the positioning of the servo piston. While many modifications will be suggested to one skilled in the art, it is intended that the scope of the invention be limited solely by the scope of the appended claims.

I claim as my invention:

1. In control apparatus for a combustion engine having exhaust gas temperature flow control means, the combination comprising: fluid motor means arranged for operating the gas flow control means, said motor means comprising a cylinder having a fluid inlet and outlet connection at each end thereof and a piston arranged in said cylinder; a pilot valve comprising a cylinder having a sleeve and a valve member arranged for axial movement in said cylinder from intermediate positions to opposite extreme positions, said pilot valve having a pair of flow paths each having inlet and outlet connections, said valve member and sleeve of the pilot valve being so arranged that both of said flow paths are open when the valve member is in an intermediate position and one of said paths is blocked when the valve member is in one extreme position and the other of said paths is blocked when the member is in the other extreme position; conduit means including a pump connected to a source of fluid to constitute a supply means and including a return means to said source of fluid; means for connecting said supply means, said return means, said pilot valve flow paths, and said cylinder inlet and outlet connections in seriatum whereby two normally open parallel fluid paths are provided through said cylinder and pilot valve from the supply to the return means, exhaust gas temperature responsive means connected for operating said valve member of said pilot valve, and feedback operating means connecting said piston and said sleeve of the pilot valve.

2. In control apparatus for a combustion engine having exhaust gas temperature flow control means, the combination comprising: motor means arranged for operating the gas flow control means, said motor means comprising a cylinder having an inlet and outlet connection at each end thereof, a piston arranged in said cylinder, conduit means including a pump for connecting a source of hydraulic fluid to said inlet connections of said cylinder, a pilot valve comprising a cylinder having a sleeve and a valve member arranged for axial movement in said cylinder from intermediate positions to opposite extreme positions, said pilot valve having a pair of flow paths each having inlet and outlet connections, said valve member and sleeve of the pilot valve being so arranged that both of said flow paths are open when the valve member is in intermediate position and one or the other of said paths is blocked when the member is in an extreme position, conduit means connecting the outlets of said cylinder to said inlet connections of said pilot valve, conduit means for connecting said outlet connections of the pilot valve to said source of fluid, feedback linkage means connecting said piston to said sleeve of the pilot valve, and exhaust gas temperature responsive control means connected for operating said valve member of said pilot valve.

References Cited in the file of this patent

UNITED STATES PATENTS

| Number | Name | Date |
| --- | --- | --- |
| 1,952,806 | Hyland | Mar. 27, 1934 |
| 2,477,452 | Guins | July 26, 1949 |
| 2,514,248 | Lombard et al. | July 4, 1950 |

FOREIGN PATENTS

| Number | Country | Date |
| --- | --- | --- |
| 412,534 | Germany | Apr. 23, 1925 |
| 19,484 | Switzerland | Feb. 26, 1900 |